United States Patent
Tesanovic et al.

(10) Patent No.: US 10,123,308 B2
(45) Date of Patent: *Nov. 6, 2018

(54) MITIGATION OF CONTROL CHANNEL INTERFERENCE

(71) Applicant: KONINKLIJKE PHILIPS N.V., Eindhoven (NL)

(72) Inventors: Milos Tesanovic, Surrey (GB); Timothy James Moulsley, Caterham (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,341

(22) Filed: Feb. 29, 2016

(65) Prior Publication Data

US 2016/0183235 A1 Jun. 23, 2016

Related U.S. Application Data

(63) Continuation of application No. 13/576,951, filed as application No. PCT/IB2011/050541 on Feb. 9, 2011, now Pat. No. 9,276,724.

(30) Foreign Application Priority Data

Feb. 15, 2010 (EP) .................................... 10305152

(51) Int. Cl.
*H04W 72/04* (2009.01)
*H04L 5/00* (2006.01)

(52) U.S. Cl.
CPC ....... *H04W 72/0406* (2013.01); *H04L 5/0053* (2013.01); *H04L 5/0062* (2013.01); *H04W 72/0453* (2013.01)

(58) Field of Classification Search
CPC . H04L 5/001; H04L 27/2626; H04L 27/2647; H04L 27/2613; H04L 5/0057;
(Continued)

(56) References Cited

U.S. PATENT DOCUMENTS

2003/0086385 A1* 5/2003 Kwon .................. H04B 7/2637
370/320
2006/0209970 A1* 9/2006 Kanterakis ............ H04L 1/0003
375/259

(Continued)

OTHER PUBLICATIONS

KDDE, NTT DoCoMo, Multiplexing of PDCCHs of Multiple UEs in E-UTRA Downlink, 3GPP TSG RAN WG1 Meeting #51BIS, Sevilla, Spain, Jan. 14-18, 2008, R1-080220, pp. 1-3.
(Continued)

*Primary Examiner* — Romani Ohri (57) ABSTRACT

The present invention relates to a method for operating a network comprising a first primary station and a second primary station, wherein the first primary station serves a first cell including at least one first secondary station communicating with the first primary station and wherein the second primary station serves a second cell including at least one second secondary station communicating with the second primary station,
the method comprising the steps of
(a) the first primary station and the second primary station transmitting payloads in a synchronous manner on at least one set of resources,
(b) the first and the second primary stations transmitting control data on the at least one set of resources respectively to the first secondary station and to the second secondary station, wherein the method further comprises
(c) at least the first primary station rendering the trans-
(Continued)

mission of control data to the first secondary station orthogonal to the transmission of control data from the second primary station.

85 Claims, 4 Drawing Sheets

(58) Field of Classification Search
CPC . H04L 27/2607; H04L 27/2655; H04B 7/066; H04B 10/532; H04B 2201/69; H04B 2201/136
See application file for complete search history.

(56) References Cited

U.S. PATENT DOCUMENTS

| | | | |
|---|---|---|---|
| 2009/0175159 A1* | 7/2009 | Bertrand | H04W 72/0406 370/203 |
| 2009/0209247 A1* | 8/2009 | Lee | H04L 5/0007 455/422.1 |
| 2009/0238099 A1* | 9/2009 | Ahmavaara | H04W 8/065 370/254 |
| 2009/0268909 A1 | 10/2009 | Girao et al. | |
| 2010/0035555 A1 | 2/2010 | Bala et al. | |
| 2010/0173637 A1* | 7/2010 | Damnjanovic | H04L 5/0007 455/447 |
| 2010/0177746 A1* | 7/2010 | Gorokhov | H04B 7/024 370/336 |
| 2011/0077038 A1* | 3/2011 | Montojo | H04B 7/024 455/507 |
| 2011/0194523 A1* | 8/2011 | Chung | H04L 5/0053 370/329 |
| 2011/0255486 A1* | 10/2011 | Luo | H04W 48/12 370/329 |
| 2012/0093098 A1* | 4/2012 | Charbit | H04W 72/04 370/329 |
| 2012/0115468 A1* | 5/2012 | Lindoff | H04W 36/06 455/434 |
| 2012/0281670 A1* | 11/2012 | Tiirola | H04W 56/00 370/330 |

OTHER PUBLICATIONS

LG Electronics, "Phich to Re Maping", 3GPP TSG RAN WG1 #51BIS, Sevilla, Spain, Jan. 14-18, 2008, R1-080537, pp. 1-4
LG Electronics, "Considerations on Interference Coordination in Heterogeneous Networks", 3GPP Draft, R1-100236 Interference Coordination in HETNET V2, 3rd Generation Partnership Project, vol. RAN WG1, Jan. 12, 2010, pp. 1-5.
NTT DOCOMO, "Comparision of Carrier Segment and Extension Carrier for Contiguous Carrier Aggregation", 3GPP Draft, R1-100491 Component Carrier Types, 3rd Generation Partnership Project, vol. RAN WG1, Jan. 12, 2010, pp. 1-5.
Philips, "Mitigation of Control Channel Interference", 3GPP Draft, R1-101288, 3rd Generation Partnership Project, vol. RAN WG1, Feb. 16, 2010, pp. 1-4.

* cited by examiner

MITIGATION OF CONTROL CHANNEL INTERFERENCE

This application claims the benefit or priority of and describes relationships between the following applications: wherein this application is a continuation of U.S. patent application Ser. No. 3/576,951, filed Aug. 3, 2012, which is the National Stage of International Application No. PCT/IB2011/050541, filed Feb. 9, 2011, which claims the priority of foreign application EP10305152.0 filed Feb. 15, 2010, all of which are incorporated herein in whole by reference The invention relates to a cellular network comprising a plurality of cells which may be interfering one with another, like in UMTS Long Term Evolution.

More specifically, the invention relates to a method for reducing interference occurring for control data between two interfering cells. This case occurs for example, but not only, for the case of synchronous cells transmissions.

This invention is, for example, relevant for mobile telecommunication networks like UMTS, UMTS LTE networks, or like broadband wireless networks or WLANs.

In many wireless systems control-channel signalling is needed that indicates the particular time-frequency transmission resources to which the data is mapped, and the format/mode in which the data itself is transmitted. For UMTS LTE Rel-8 downlink communication, the relevant control channel that includes resource allocation and transmission format information is known as Physical Downlink Control Channel (PDCCH).

Each PDCCH is transmitted using one or more Control Channel Elements (CCEs), where each CCE corresponds to a plurality of sets of four physical resource elements. The number of CCEs used for transmission of a particular PDCCH is determined according to the channel conditions by the primary station, the ENodeB (or eNB) in LTE.

PDCCH transmissions from neighbouring or overlapping cells at the same carrier frequency may interfere with one another. This problem will become especially pronounced if the cells in question are synchronized or nearly synchronized with time-aligned transmissions. Indeed, in this case, the two transmissions of PDCCH may occur exactly at the same time and collides one with another. On the other hand, for some transmission modes, such as CoMP (Co-operative Multi-Point), synchronisation is deemed essential for satisfactory performance. Indeed, Co-operative Multi-Point transmissions are generally MIMO transmissions where antennas from a plurality of cells are used for a single transmission to users.

Ways of mitigating the PDCCH interference are therefore required.

In LTE Release 8 the main mechanism for mitigating the effect of interference on the PDCCH is randomization of the Resource Elements (REs) in the frequency domain (over the system bandwidth) and in the time domain (over the OFDM symbols reserved for control channels).

Existing methods for increasing robustness by randomisation in LTE include:
Increased sparseness of control channels. This can be done e.g. by expanding to 3 OFDM symbols, even if this is not required by PDCCH loading.
Power boosting the PDCCH transmissions. This is effective against PDSCH interference since PDSCH is not power boosted. However, it needs to be combined with "increased sparseness" to be highly efficient.
Increased aggregation level used for PDCCH. This would increase robustness for an individual PDCCH transmission, but would lead to higher interference, so is not likely to be very effective.

However, none of these methods are effective enough, especially in case of fully aligned transmissions, like for a single base station which is serving two or three interfering cells.

It is an object of the invention to propose a method which alleviates the above mentioned problems.

It is another object of the invention to provide a method for reducing the interference of PDCCHs experienced because of synchronised or nearly synchronised cells.

It is another object of the invention to improve the quality of reception of the control data especially at the edge of the cells.

In accordance with a first aspect of the invention, a method is proposed for operating a network comprising a first primary station and a second primary station, wherein the first primary station serves a first cell including at least one first secondary station communicating with the first primary station and wherein the second primary station serves a second cell including at least one second secondary station communicating with the second primary station, the method comprising the steps of
(a) the first primary station and the second primary station transmitting payload in a synchronous manner on at least one set of resources,
(b) the first and the second primary stations transmitting control data on the at least one set of resources respectively to the first secondary station and to the second secondary station,
wherein the method further comprises (c) at least the first primary station rendering the transmission of control data to the first secondary station orthogonal to the transmission of control data from the second primary station.

The present invention also relates to a primary station comprising means for operating a network comprising a the primary station and a further primary station, wherein the primary station serves a first cell including at least one first secondary station communicating with the primary station and wherein the further primary station serves a second cell including at least one second secondary station communicating with the second primary station, the primary station comprising means for transmitting payload synchronously with the further primary station on at least one set of resources, wherein the means for transmitting are arranged for transmitting control data on the at least one set of resources to the first secondary station, and wherein the primary station is arranged for rendering the transmission of control data to the first secondary station orthogonal to transmission of control data from the further primary station.

According to another aspect of the invention, it is proposed a secondary station comprising means implementing the invention.

These and other aspects of the invention will be apparent from and will be elucidated with reference to the embodiments described hereinafter.

The present invention will now be described in more detail, by way of example, with reference to the accompanying drawings, wherein.

The invention relates to a cellular network divided into cells, each cell being served by a primary station and the secondary station within one cell are communicating at least with the primary station serving the considered cell. A single primary station may serve more than one cell (usually three).

Figure 1:
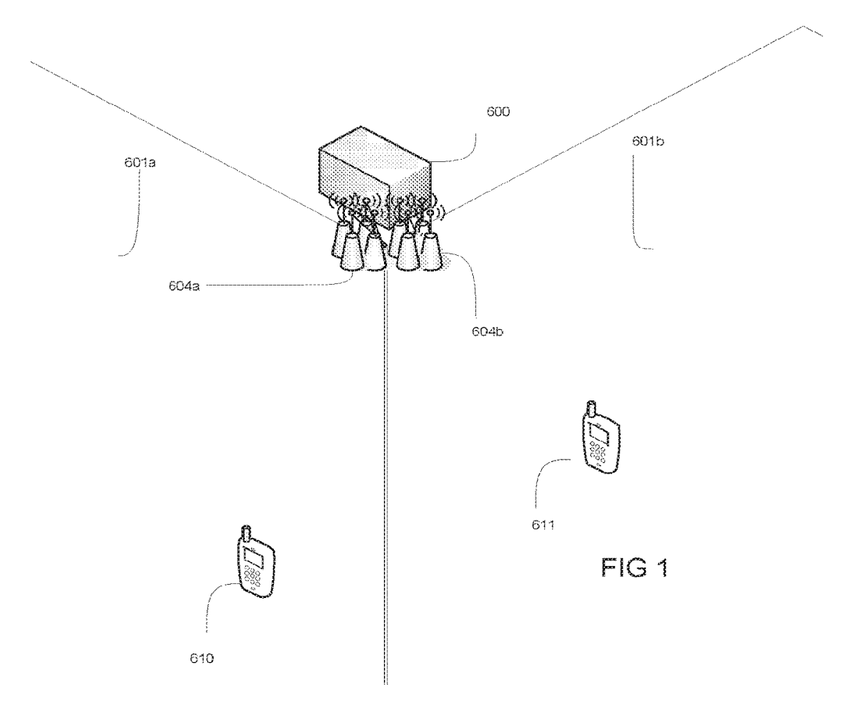
FIG. 1 is a block diagram of a network where the invention is implemented.

In an exemplary embodiment of the invention illustrated on FIG. 1, a secondary station 610 is within a serving cell 601a and communicates with a primary station 600. In this example, the primary station 600 serves cells 601a and 601b. In an example of this embodiment of the invention, such a telecommunication system operates under the UMTS specifications or LTE specifications. Accordingly, the primary station 600 may be an eNodeB and the secondary station 610 is a User Equipment (UE). A second cell 601b neighbouring cell 601a is represented on FIG. 1. This cell 601b is controlled by the same primary station 600. A secondary station 611 is in the second cell 601b and communicates with the primary station 600.

For the sake of clarity only one secondary station per cell is represented, however, a plurality of secondary stations may be within a cell.

Primary station 600 comprises an antenna array divided in two subarrays 604a and 604b respectively dedicated to each respective cell, in this example four antennas per cell (but can be more (e.g. 8 or 16 per cell)). In accordance with a cooperative beamforming mode, the secondary station 610 may receive signals from antennas 604a and 604b dedicated to cells 601a and 601b. The consequence of the having a single primary station serving two cells, and as well of having the cooperative beamforming mode active is that the downlink communication channels are time aligned. Even if in other examples the communication channels may not be totally synchronized, the invention reduces the amount of interference experienced on the PDCCH.

Moreover, to reduce the impact of the interference, solutions examined by the inventors comprises TDMA applied to control channel subframes
  Scheduler uses different subframes for PDCCH in different cells on the same frequency. However, some subframes would not be accessible for some User Equipments (UEs) in some cells
  Could be combined with a frequency reuse factor applied to control channel carriers. However, cross carrier scheduling required to give all UEs access to all subframes
  Can be implemented with no specification changes
  Inter subframe resource allocation could be added (known from prior art)
TDMA applied to OFDM symbols
  Scheduler uses different OFDM symbols in the control region for PDCCH for different cells on the same frequency. This enables to be backwards compatible with Release 8 PDCCH transmissions if a Release 10 PDCCH is modified to use only a subset of the Release 8 REs in a given OFDM symbol.
  Can be implemented based on symbol timing offset between carriers (known from prior art)
FDMA and Frequency re-use factor applied to control channel carriers
  From a given site not all the carriers carry PDCCH. However, cross-carrier scheduling would be required for unity frequency reuse factor for PDSCH
  Compatible with carrier aggregation
  Co-ordination required between schedulers for different cells
    The co-ordination could be to agree for a cell a preference on the cell (i.e. carrier) that should provide the PDCCH
    No specification changes required (except for addition of cross-carrier scheduling in carrier aggregation as already agreed for Release 10).

Thus, it is required to provide orthogonality (or the possibility of orthogonality) between PDCCH transmissions from different cells. This approach should enable successful functioning of the network with synchronized cells with time aligned subframes (e.g. controlled by the same eNB). In addition, it is considered how to make the transmission scheme backwards compatible with earlier release terminals, in the sense that such terminals can operate properly in a network that implements the invention, while orthogonality can be maintained for terminals implementing the invention.

As a consequence, the embodiments of the invention propose new methods for achieving control channel orthogonality in LTE. It is to be noted that for methods based on "puncturing", in this context puncturing means that for a RE (resource element) where a signal would be present without puncturing, nothing is transmitted when the RE is punctured. In fact, the primary station is muted and does not transmit anything on the punctured RE. On the contrary, the unpunctured Resource Elements are REs where the primary station does transmit.

Figure 2:
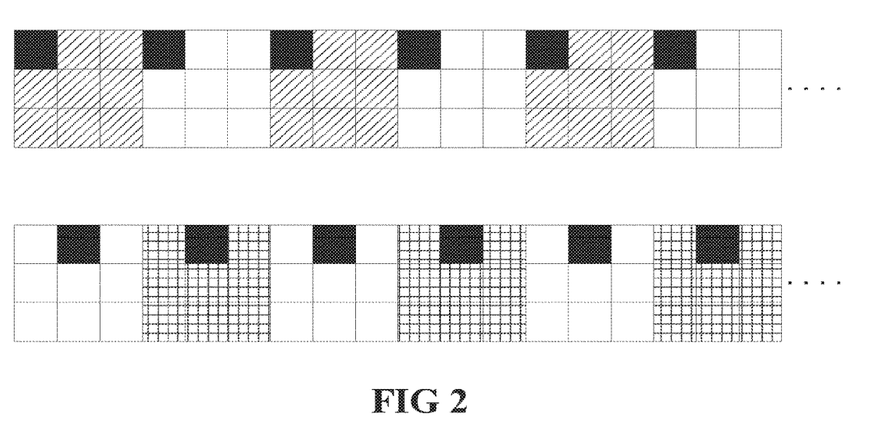
FIG. 2 is a time frequency diagram showing the possible scheduling of PDCCHs in accordance with a first embodiment.

In accordance with a first embodiment of the invention, illustrated on FIG. 2, FDMA and Frequency re-use factor are applied to control channel resource blocks used for PDCCH. FIG. 2 is a time frequency diagram showing the resource blocks (square of nine resource elements, each resource element is represented as a square). On FIG. 2, it is shown that the available resource blocks for PDCCH for the first cell (striped blocks of the top diagram) are not to be used by the second cell for the PDCCH. Similarly, the resource blocks available for PDCCH in the second cell are not interfered by any transmission from the first cell. FIG. 2 shows Resource blocks used for PDCCH in two neighbouring cells, with re-use factor applied to control channel resource blocks.

This embodiment has the advantage to be backwards compatible with Release 8 PDCCH transmissions if a Release 10 PDCCH is modified to use only a subset of the Release 8 resource blocks. For a Rel 10 UE the Rel 8 resources in given RBs are punctured according to the cell ID to provide a new set of orthogonal resources. The number of different sets of orthogonal resources is equal to the re-use factor (e.g. 2 out of 3 RBs are punctured for a re-use factor of 3). To keep the performance similar to Rel 8, the aggregation level should be increased before puncturing (e.g. by a factor of 2 or 4).

Figure 3:
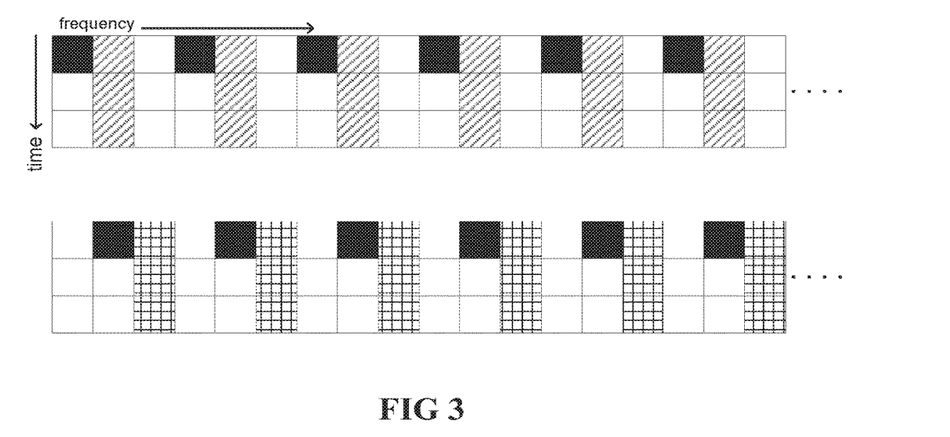
FIG. 3 is a time frequency diagram showing the possible scheduling of PDCCHs in accordance with a second embodiment.

In accordance with a second embodiment of the invention, illustrated on FIG. 3, FDMA and Frequency re-use factor applied to control channel sub-carriers. FIG. 3 shows Resource blocks used for PDCCH in two neighbouring cells, with re-use factor applied to control channel sub-carriers.

This embodiment is also backwards compatible with Release 8 PDCCH transmissions if a Release 10 PDCCH is modified to use only a subset of the Release 8 sub-carriers. For a Rel 10 UE, the Rel 8 sub-carriers are punctured according to the cell ID to provide a new set of orthogonal resources. The number of different sets of orthogonal resources is equal to the re-use factor (e.g. 2 out of 3 RBs are punctured for a re-use factor of 3). To keep the Rel 8 performance, the aggregation level should be increased before puncturing (e.g. by a factor of 2 or 4).

In accordance with this embodiment, co-ordination is required between schedulers for different cells. The co-ordination could be to agree a preference on the subset of control CCEs to be used for each cell (for each DCI aggregation level). This is equivalent to a cell-specific preference for the part of the search space to be used.

This requires good orthogonality between sub-carriers (e.g. close timing synchronization between cells).

In a variant of this embodiment, FDMA and Frequency re-use factor are applied to control channel search space: The primary station chooses orthogonal positions in the search space for different UEs in different cells. This means that the schedulers use different PDCCH sub-carriers in different cells on the same frequency. This can be achieved under the assumption of the same system bandwidth and same number of OFDM symbols reserved for control channel. Co-ordination is required between schedulers for different cells. The co-ordination could be to agree a preference on the subset search space elements be used for each cell (for each DCI aggregation level). This is equivalent to a cell-specific preference for the part of the search space to be used. Again, this may require good orthogonality between sub-carriers (e.g. close timing synchronization between cells). However, this can be implemented with no changes to the standard specification.

Modified search spaces could also be added for Release 10 UEs. With new search space designs (e.g. if reduced/modified search spaces are specified for carrier aggregation), the search space could be a UE specific configuration, or depend on the Cell ID.

If the number of OFDM symbols allocated for control information is different between the cells then two different search space positions are not necessarily fully orthogonal in different cells.

Note: In LTE there is a further complication due to insertion of CRS and PHICH in different positions in different cells. This means that two different search space positions are not necessarily fully orthogonal in different cells (see FIG. 4). In such cases it would be helpful if the number of CRS and the PHICH durations are the same in both cells.

Figure 4:
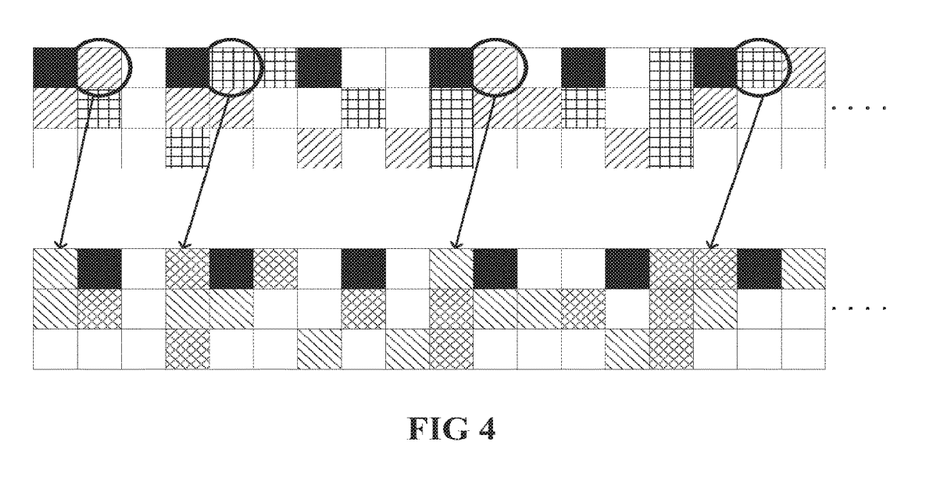
FIG. 4 is a time frequency diagram showing the possible scheduling of PDCCHs in accordance with a third embodiment.

On FIG. 4, two search space positions for the first cell (striped and squared) are orthogonal within Cell A. Some resource elements for the same search space positions are different in Cell B (designated with arrows). The two search space positions for the second cell (striped and squared) are still orthogonal in Cell B. The potentially interfering transmissions from the two cells arising from control channels in positions both striped (for example) are orthogonal between the two cells except for the CRS locations (black)

However, the bigger problem for receiving the "non-orthogonal" resource elements is probably interference from CRS instead of PDCCH.

CDM applied to control channel search

An orthogonal spreading code is applied to the PDCCH transmission. If by a factor of 2, 4 or 8, this would correspond directly to a larger PDCCH format size. Two alternative examples are:

Spreading could be applied at the symbol level

Spreading could be achieved by generating one or more additional copies of the PDCCH message (with the spreading code elements applied per message).

This has the advantage that the at least one copy of the message would be transmitted in a backwards compatible way.

Each copy of the message could be transmitted in a defined part of the search space (e.g. sequentially). In this case, spreading could be applied as part of the rate matching process where multiple copies of the information bits are generated.

If the number of OFDM symbols allocated for control information is different between the cells then two PDCCH transmissions in different cells, with different spreading codes but otherwise identical, would occupy different resource elements and orthogonal spreading codes would not generally result in orthogonal signals.

Note: In LTE there is a further complication due to insertion of CRS and PHICH in different positions in different cells. This means that two PDCCH transmissions in different cells, with different spreading codes but otherwise identical, may occupy different resource elements and therefore may not be fully orthogonal between the different cells. In such cases it would be helpful if the number of CRS and the PHICH durations are the same in both cells. However, the bigger problem for receiving the "non-orthogonal" resource elements is probably interference from CRS instead of PDCCH.

Thus, in accordance with the embodiments of the invention, it is proposed to use one or more of the described method, which reduces the amount of interference for the PDCCH.

One of the preferred solution is the puncturing of frequency domain control channel resources to provide orthogonality between cells. The transmissions according to the new scheme are backwards compatible.

It is also possible to have a spreading code or sequence applied to control channel to provide orthogonality between cells. This can be done in a way whereby at least part of the information transmitted according to the new scheme is in a form which is backwards compatible In accordance to another embodiment, it is proposed to have a selection of a resource set (position in search space) in one cell known to be orthogonal to the resource sets used in a neighbouring cell.

In all of these variants, it may be relevant to provide some signalling between eNBs e.g. to indicate which puncturing/spreading code/resource sets are in use.

In accordance with another embodiment, it is proposed a system like LTE, where the downlink transmissions from adjacent cells are synchronized and time-aligned at the subframe level. This can be achieved easily for cells controlled by the same eNodeB. Preferably the cells have the same carrier frequency and system bandwidth. The control channel transmissions (PDCCH) from different cells are preferably orthogonal in the frequency domain. This is achieved by puncturing the PDCCH transmissions from a given cell in a given set of RBs corresponding to the cell ID. In a preferred embodiment every Mth RB is unpunctured. Preferably M=3 for the case of 3 cells supported from the same cell site. Preferably M=2 for the case of non-overlapping femto cells inside the coverage area of a macro cell. The UE is informed by signalling that the puncturing is applied.

In a variation of the preferred embodiment the puncturing is per sub-carrier and every Mth sub-carrier is unpunctured. In this case the unpunctured sub-carriers preferably do not contain CRS.

In a further variation the set of unpunctured RBs (or sub-carriers) further depends on the OFDM symbol considered.

In a variation the set of unpunctured RBs (or sub-carriers) is signalled to the UE or depends on Cell ID mod M.

In a variation the size of the coded PDCCH data block is expanded by a factor of N (N=2, 4 or 8) before puncturing. In LTE this can be achieved by choosing a different PDCCH format with a larger number CCEs.

In further variations:
- The puncturing is applied only for some PDCCH messages (e.g. in the UE specific search space).
- The puncturing is applied only over part of the search space (e.g. the existing search space is unpunctured to allow communication with UEs not using the invention, but a new search space is added including puncturing)
- The search space is modified if puncturing is applied (e.g. increased for large PDCCH format sizes and/or reduced for small PDCCH format sizes)
- The puncturing is applied only for some PDCCH formats (e.g. only formats with large sizes)
- The puncturing is applied only for some DCI formats (e.g. those indicating transmission modes suitable for communication at the cell border, typically robust modes with low data rates)
- The puncturing is applied only on some carriers (e.g. carriers used by femto cells inside macro cell coverage areas)

Another preferred embodiment is the same as the first embodiment (and the above variations), except that puncturing by a factor M is replaced by spreading by a factor M.

At least some aspects of the invention can be applied to other control channels such as PHICH in LTE.

The embodiments of this invention have particular, but not exclusive, application to wireless communication systems such as UMTS, UMTS LTE, and UMTS LTE-Advanced, as well as wireless LANs (IEEE 802.11n) and broadband wireless (IEEE 802.16).

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of radio communication.

The invention claimed is:

1. A primary station comprising:
a processor of the primary station allowing a transmitter of the primary station to transmit through an array of antennas, control data in a signal to a secondary station according to at least one of: a first subset of a set of resources, a search space, and a spreading code, or any combination thereof,
while a further processor of a further primary station allows a further transmitter of the further primary station to transmit through an array of antennas further control data in a further signal to a further secondary station using a further subset of the same set of resources, at a time at least partially overlapping a time that the control data is being transmitted, resulting in at least a partially simultaneous transmissions of the control data with the further control data,
wherein the first subset of the set of resources is sent from the primary station orthogonal to the further subset of resources being sent from the further primary station.

2. The primary station of claim 1, wherein:
the first subset of the set of resources comprises a subset of a plurality of Resource Blocks; and
the subset of the plurality of Resource Blocks comprises one Resource block every M Resource Blocks of the plurality of Resource Blocks, where M is an integer.

3. The primary station of claim 1, wherein:
the first subset of the set of resources comprises a subset of a plurality of Resource Blocks; and
the subset of the plurality of Resource Blocks comprises one resource block every M Resource Blocks of the plurality of Resource Blocks, where M equals 3 or 6.

4. The primary station of claim 1, wherein:
the first subset and further subset of the set of resources comprises respective subsets of a plurality of subcarriers, and
wherein the orthogonal transmission comprises: the primary station transmitting the control data using the first subset of the plurality of subcarriers, and the further primary station transmitting the further control data using the further subset of the plurality of carriers; and
wherein the first subset and the further subset are different subsets of the plurality of subcarriers, such that, the primary station transmits the control data using the subset of the set of subcarriers with the further primary station transmitting the further control data using the further subset of the set of subcarriers.

5. The primary station of claim 1, wherein:
the first subset and further subset of the set of resources comprises respective subsets of a plurality of subcarriers, and
wherein the orthogonal transmission comprises the primary station transmitting the control data using the subset of the plurality of subcarriers, and the further primary station transmitting the further control data using the further subset of the plurality of subcarriers; and
wherein the first subset and further subset are different subsets of the plurality of subcarriers, such that, the further primary station uses the further subset of subcarriers for transmitting further control data; and
wherein the respective subsets of the plurality of subcarriers comprise one subcarrier every M subcarriers of the plurality of subcarriers, where M is an integer.

6. The primary station of claim 1, wherein an indication of the further subset of the set of resources is signaled by the primary station to the further primary station.

7. The primary station of claim 1, wherein an indication of the further subset of the set of resources is signaled by the primary station to the secondary station.

8. The primary station of claim 1, wherein:
the processor of the secondary station searches for the control data in messages that it receives from the primary station by decoding messages potentially included in a search space; and
the processor of the further secondary station searches for the further control data in further messages that it receives, by decoding all the further messages potentially included in a further search space, and wherein the orthogonal transmission comprises the processor of the primary station configuring the search space of the secondary station, such that, at least one piece of resource of the search space of the secondary station is not included in the further search space of the further secondary station.

9. The primary station of claim 1, wherein:
the processor of the secondary station searches in messages that it receives for the control data by decoding messages potentially included in a search space of the secondary station; and
the search space of the secondary station is determined by a processor of the secondary station from an indication of an identifier of the cell of the primary station.

10. The primary station of claim 1, wherein:
the processor of the secondary station searches in messages that it receives from the primary station for the control data by decoding messages potentially included in a search space of the secondary station; and
an indication of the search space of the secondary station is signaled by the primary station to the further primary station.

11. The primary station of claim 1, wherein:
the processor of the secondary station searches in messages that it receives from the primary station for the control data by decoding the messages potentially included in a search space of the secondary station; and
an indication of the search space of the secondary station is signaled by the primary station to the secondary station.

12. The primary station of claim 1, wherein the orthogonal transmission comprises:
the processor of the primary station applying a spreading code to the transmission of the control data from the primary station; and
the spreading code being orthogonal to a further spreading code applied to the further transmission of the further control data from the further primary station.

13. The primary station of claim 1, wherein:
the orthogonal transmission comprises the processor of the primary station applying a spreading code to the transmission of the control data in a signal from the primary station to the secondary station; and
the spreading code being determined from an indication of an identity of the cell of the secondary station.

14. The primary station of claim 1, wherein:
the orthogonal transmission comprises a processor of the primary station applying a spreading code to the transmission of the control data from the primary station to the secondary station; and
an indication of the spreading code being signaled by the primary station to the further primary station.

15. The primary station of claim 1, wherein:
the orthogonal transmission comprises the processor of the primary station applying a spreading code to the transmission of control data from the primary station to the secondary station; and
an indication of the spreading code being signaled by the primary station to the secondary station.

16. The primary station of claim 1, wherein:
both the control data and the further control data are transmitted in respective signals to the secondary station and the further secondary station; and
the secondary station discards the further control data and the further secondary station discards the control data.

17. The primary station of claim 1,
wherein the processor of the primary station is configured to prevent the transmission of the control data in a signal from the primary station to the secondary station using the first subset of the set of resources during the transmission orthogonal to the further transmission, to enable the further transmitter of the further primary station to further transmit the further control data in the further signal using the further subset of the set of resources during the transmission orthogonal to the further transmission.

18. The primary station of claim 1, wherein:
the primary station and the further primary station are included in a same single base station;
the first subset of the set of resources comprising a plurality of one of:
subcarriers; and Resource Blocks; and
the processor is configured to prevent transmission of the control data in the signal from the primary station to the secondary station using the first subset of the set of resources during the transmission orthogonal to the further transmission, to enable the further transmitter of the further primary station to further transmit the further control data in the further signal using the further subset of the set of resources during the transmission and orthogonal to the further transmission.

19. A primary station comprising:
a processor of the primary station configured to allow a transmitter of the primary station to transmit control data in a signal using a subset of a set of resources to a secondary station,
while a further processor of a further primary station is configured to allow a further transmitter of the further primary station to transmit further control data in a further signal using a further subset of the same set of resources to a further secondary station at a time at least partially overlapping with a time that the control data is being transmitted, resulting in at least a partially simultaneous transmission of the control data with the further control data; and
the transmitter is configured for arranging the control data transmission to be orthogonal to transmission of the further control data from the further primary station to a further secondary station.

20. The primary station of claim 19, wherein:
the subset of the set of resources comprises a subset of a plurality of Resource Blocks; and
the subset of the plurality of Resource Blocks comprises one Resource block every M Resource Blocks of the plurality of Resource Blocks, where M is an integer.

21. The primary station of claim 19, wherein:
the first subset and further subset of the set of resources comprises respective subsets of a plurality of subcarriers, and
wherein the orthogonal transmission comprises: the primary station transmitting control data using the first subset of the plurality of subcarriers, and the further primary station transmitting further control data using the further subset of the plurality of carriers.

22. The primary station of claim 19, wherein:
the first subset and further subset of the set of resources comprises respective subsets of a plurality of subcarriers, and
the orthogonal transmission comprises the primary station transmitting control data using the first subset of the plurality of subcarriers, and the further primary station transmitting further control data using a further subset of the plurality of subcarriers; and the first subset and further subset are different subsets of the plurality of subcarriers, such that, the further primary station uses the further subset of subcarriers for transmitting further control data; and the respective subsets of the plurality of subcarriers comprise one subcarrier every M subcarriers of the plurality of subcarriers, where M is an integer.

23. The primary station of claim 19, wherein an indication of the subset of the set of resources is signaled by the primary station to one of the further primary station and the secondary station.

24. The primary station of claim 19, wherein:
the orthogonal transmission comprises the primary station configuring the search space of the secondary station, such that, at least one piece of resource of the search space of the secondary station is not included in the further search space of the further secondary station.

25. The primary station of claim 19, wherein:
a processor of the secondary station searches in messages that it receives from the primary station for the control data by decoding messages potentially included in a search space of the secondary station; and
wherein an indication of the search space is signaled by the primary station to the further primary station.

26. The primary station of claim 19, wherein:
a processor of the secondary station searches in messages that it receives from the primary station for the control data by decoding the messages potentially included in a search space of the secondary station; and
wherein an indication of the search space is signaled by the primary station to the secondary station.

27. The primary station of claim 19, wherein the orthogonal transmission comprises:
the processor of the primary station applying a spreading code to the transmission of the control data from the primary station; and
the spreading code being orthogonal to a further spreading code applied to the further transmission of the further control data from the further primary station.

28. The primary station of claim 19, wherein:
the orthogonal transmission comprises the primary station applying a spreading code to the transmission of control data from the primary station to the secondary station; and
an indication of the spreading code is signaled by the primary station to one of the further primary station and the secondary station.

29. The primary station of claim 19, wherein the transmitter of the primary station is configured to prevent transmission of the control data in a signal from the primary station to the secondary station using the first subset of the set of resources during the transmission orthogonal to the further transmission, for enabling the further transmitter of the further primary station to further transmit the further control data in the further signal using the further subset of the set of resources during the transmission orthogonal to the further transmission.

30. The primary station of claim 19, wherein:
the primary station and the further primary station are included in a same single base station;
the set of resources comprising a plurality of one of the group of: subcarriers; and Resource Blocks; and
the processor of the primary station is configured to prevent a transmitter of the primary station from transmitting the control data in the signal from the primary station to the secondary station using the first subset of the set of resources during the transmission synchronous with and orthogonal to the further transmission, for enabling the further transmitter of the further primary station to further transmit the further control data in the further signal using the further subset of the set of resources during the transmission synchronous with and orthogonal to the further transmission.

31. A secondary station comprising:
a receiver configured to receive control data in a signal from a primary station according to at least one of: a subset of a set of resources, a search space, and a spreading code, while a further primary station is allowed to transmit further control data in a further signal to a further secondary station, at a time that at least partially overlaps a time that the receiver is receiving transmitted control data, resulting in at least a partially simultaneous transmission of the control data with the further control data, and
wherein the receiver is configured to receive the control data signal that is orthogonal to the further signal of the further control data.

32. The secondary station of claim 31, wherein the secondary station and the further secondary station are the same secondary station.

33. The secondary station of claim 31, wherein the orthogonal transmission of the control data to the secondary station is orthogonal in the frequency domain to the transmission of the further control data to the further secondary station.

34. The secondary station of claim 31, wherein:
the orthogonal transmission comprises: the primary station transmitting the control data using a first subset of the set of resources, and the further primary station transmitting the further control data using a further subset of the set of resources; and
the first subset and further subset are different subsets of the set of resources.

35. The secondary station of claim 31, wherein:
the first subset of the set of resources comprises a subset of a plurality of Resource Blocks; and
the orthogonal transmission comprises: the primary station transmitting the control data using a first subset of the plurality of Resource Blocks, and the further primary station transmitting the further control data using a further subset of the plurality of Resource Blocks; and
wherein the first subset and further subset are different subsets of the plurality of Resource Blocks.

36. The secondary station of claim 31, wherein:
the first subset of the set of resources comprises a subset of a plurality of Resource Blocks; and
the first subset of the set of Resource Blocks comprises one Resource block every M Resource Blocks of the plurality of Resource Blocks, where M is an integer.

37. The secondary station of claim 31, wherein:
the first subset of the set of resources comprises a subset of a plurality of Resource Blocks; and
the first subset of the plurality of Resource Blocks comprises one Resource block every M Resource Blocks of the plurality of Resource Blocks, where M equals 3 or 6.

38. The secondary station of claim 31, wherein:
the first subset and the further subset of the set of resources comprises respective subsets of a plurality of subcarriers, and
the orthogonal transmission comprises: the primary station transmitting the control data in a signal using the first subset of the plurality of subcarriers, and the further primary station transmitting the further control data in a further signal using a further subset of the plurality of subcarriers.

39. The secondary station of claim 31, wherein:
the first subset and further subset of the set of resources comprises respective subsets of a plurality of subcarriers; and
wherein the orthogonal transmission comprises: the primary station transmitting the control data in a signal using a subset of the plurality of subcarriers; and the further primary station transmitting the further control data in a signal using a further subset of the plurality of subcarriers; and
wherein the first subset and further subset are different subsets of the plurality of subcarriers, such that, the further primary station uses the subset of the plurality of subcarriers for transmitting control data, and the respective subsets of the plurality of subcarriers comprise one subcarrier every M subcarriers of the plurality of subcarriers, where M is an integer.

40. The secondary station of claim 31, wherein an indication of the subset of the set of resources is signaled by the primary station to the further primary station.

41. The secondary station of claim 31, wherein an indication of the subset of the set of resources is signaled by the primary station to the secondary station.

42. The secondary station of claim 31, wherein:
a processor of the secondary station searches for the control data in messages that it receives from the primary station, by decoding the messages potentially included in a search space; and
a processor of the further secondary station searches for the further control data in further messages that it receives, by decoding all the further messages potentially included in a further search space; and
wherein the orthogonal transmission comprises a processor of the primary station configuring the search space of the secondary station, such that, at least one piece of resource of the search space of the secondary station is not included in the further search space of the further secondary station.

43. The secondary station of claim 31, wherein:
the secondary station searches in messages that it receives for the control data by decoding messages potentially included in a search space of the secondary station.

44. The secondary station of claim 31, wherein:
a processor of the secondary station searches in messages that it receives from the primary station for the control data by decoding messages potentially included in a search space of the secondary station; and
wherein an indication of the search space is signaled by the primary station to the further primary station.

45. The secondary station of claim 31, wherein:
a processor of the secondary station searches in messages that it receives from the primary station for the control data by decoding the messages potentially included in a search space of the secondary station; and
wherein an indication of the search space is signaled by the primary station to the secondary station.

46. The secondary station of claim 31, wherein the orthogonal transmission comprises:
a processor of the primary station applies a spreading code to the transmission of the control data in a signal from the primary station to the secondary station; and
the spreading code being orthogonal to a further spreading code applied to the further transmission of the further control data in a further signal from the further primary station to the further secondary station.

47. The secondary station of claim 31, wherein:
the orthogonal transmission comprises a processor of the primary station applying a spreading code to the transmission of the control data in a signal from the primary station to the secondary station.

48. The secondary station of claim 31, wherein:
the orthogonal transmission comprises a processor of the primary station applying a spreading code to the transmission of control data from the primary station to the secondary station; and
wherein an indication of the spreading code is signaled by the primary station to the further primary station.

49. The secondary station of claim 31, wherein:
the orthogonal transmission comprises a processor of the primary station applying a spreading code to the transmission of the control data from the primary station to the secondary station; and
wherein an indication of the spreading code is signaled by the primary station to the secondary station.

50. A secondary station comprising:
a receiver configured to receive control data in a signal using a first subset of a set of resources, from a primary station, while a further primary station is allowed to transmit further control data in a further signal to a further secondary station using a further subset of the same set of resources at a time overlapping with a time that the receiver is receiving the control data, resulting in at least a partially simultaneous transmission of the control data with the further control data; and
the receiver configured to receive the control data signal that is orthogonal to the further signal of the further control data.

51. The secondary station of claim 50, wherein:
the primary station is located at the further primary station.

52. The secondary station of claim 50, wherein:
the orthogonal transmission comprises: a processor of the primary station transmitting the control data using a first subset of the set of resources, and the further primary station transmitting the further control data using a further subset of the set of resources; and
wherein the first subset and further subset are different subsets of the set of resources.

53. The secondary station of claim 50, wherein:
the first subset of the set of resources comprises a subset of a plurality of Resource Blocks; and
the orthogonal transmission comprises: a processor of the primary station transmitting control data using a subset of the plurality of Resource Blocks, and the further primary station transmitting further control data using a further subset of the plurality of Resource Blocks; and
wherein the subset and further subset are different subsets of the plurality of Resource Blocks.

54. The secondary station of claim 50, wherein:
the first subset of the set of resources comprises a subset of a plurality of Resource Blocks; and
the first subset of the set of Resource Blocks comprises one Resource block every M Resource Blocks of the plurality of Resource Blocks, where M is an integer.

55. The secondary station of claim 50, wherein:
the first subset of the set of resources comprises a subset of a plurality of Resource Blocks; and the first subset of the plurality of Resource Blocks comprises one Resource block every M Resource Blocks of the plurality of Resource Blocks, where M equals 3 or 6.

56. The secondary station of claim 50, wherein:
the first subset and the further subset of the set of resources comprises respective subsets of a plurality of subcarriers, and
the orthogonal transmission comprises: the primary station transmitting the control data in a signal using the subset of the plurality of subcarriers, and the further primary station transmitting the further control data in a further signal using the further subset of the plurality of subcarriers.

57. The secondary station of claim 50, wherein:
the first subset and further subset of the set of resources comprises respective subsets of a plurality of subcarriers; and
wherein the orthogonal transmission comprises: the primary station transmitting the control data in a signal using a subset of the plurality of subcarriers; and the further primary station transmitting the further control data in a signal using a further subset of the plurality of subcarriers; and
the first subset and further subset are different subsets of the plurality of subcarriers, such that, the further primary station uses the further subset of the plurality of subcarriers for transmitting the control data, and the respective subsets of the plurality of subcarriers comprise one subcarrier every M subcarriers of the plurality of subcarriers, where M is an integer.

58. The secondary station of claim 50, wherein:
the secondary station searches for the control data in messages that it receives from the primary station by decoding messages potentially included in a search space of the secondary station; and
an indication of the search space is signaled by the primary station to the further primary station.

59. The secondary station of claim 50, wherein:
the secondary station searches in messages that it receives from the primary station for the control data by decoding the messages potentially included in a search space of the secondary station; and
an indication of the search space is signaled by the primary station to the secondary station.

60. The secondary station of claim 50, wherein:
the orthogonal transmission comprises the primary station applying a spreading code to the transmission of the control data from the primary station to the secondary station; and
an indication of the spreading code is signaled by the primary station to the further primary station.

61. The secondary station of claim 50, wherein:
the orthogonal transmission comprises the primary station applying a spreading code to the transmission of the control data from the primary station to the secondary station; and
an indication of the spreading code is signaled by the primary station to the secondary station.

62. A method for operating a primary station, the method comprising:
transmitting, via a transmitter, control data in a signal to a secondary station according to at least one of: a first subset of a set of resources, a search space, and a spreading code, or any combination thereof;
while allowing a further transmitter of a further primary station to transmit further control data in a further signal to a further secondary station using a further subset of the same set of resources, at a time at least partially overlapping the a time that the control data is being transmitted, resulting in at least a partially simultaneous transmission of the control data and the further control data, wherein the first subset of the set of resources is sent from the primary station orthogonal to the further subset of resources being sent from the further primary station.

63. A method of operating a secondary station, the method comprising:
receiving, via a receiver, control data transmissions in a signal from a primary station according to at least one of: a first subset of a set of resources, a search space, and a spreading code, while a further primary station is allowed to transmit further control data in a further signal, at a time that at least partially overlaps a time that the receiver is receiving the control data, resulting in at least a partially simultaneous transmission of the control data and the further control data, wherein the receiver is configured to receive the control data signal that is orthogonal to the further signal of the further control data.

64. A non-transitory computer-readable storage-medium having stored thereon instructions that when executed cause processing circuitry of a primary station to:
transmit, via a transmitter, control data in a signal to a secondary station according to at least one of: a subset of a set of resources, a search space, and a spreading code, or any combination thereof,
while allowing a further transmitter of a further primary station to transmit further control data in a further signal to a further secondary station using a further subset of the same set of resources, at a time at least partially overlapping the time that the control data is being transmitted via the transmitter, resulting in at least a partially simultaneous transmission of the control data with the further control data wherein the first subset of the set of resources is sent from the primary station orthogonal to the further subset of resources being sent from the further primary station.

65. A non-transitory computer-readable storage-medium having stored thereon instructions that when executed cause processing circuitry of a secondary station to:
receiving via a receiver of the secondary station, control data transmissions in a signal from the primary station according to at least one of: a first subset of a set of resources, a search space, and a spreading code, or any combination thereof; while a further primary station is allowed to transmit further control data in a further signal, at a time that at least partially overlaps a time that the receiver is receiving the control data, resulting in at least a partially simultaneous transmission of the control data and the further control data, wherein the receiver is configured to receive the control data signal that is orthogonal to the further signal of the further control data.

66. A network comprising:
A primary station configured to communicate with a first secondary station and to communicate with a second secondary station, the primary station including a processor configured to send via a transmitter first control data to the first secondary station in a first subset of a set of resources, and wherein the processor of the primary station is further configured to send via the transmitter second control data to the second secondary station in a second subset of the set of resources, wherein the first subset of resources is sent from the primary station orthogonal to the second subset of resources.

67. A network according to claim 66, wherein the first and second secondary stations are a single secondary station.

68. A network according to claim 66, wherein the first and second subset of resources are orthogonal in the frequency domain.

69. A network according to claim 66, wherein the first and second subset of resources are orthogonal in the time domain.

70. A network according to claim 69, wherein the orthogonality is achieved by puncturing at least one of the first and second control data.

71. A network according to claim 66, wherein the first and second control data is sent from the primary station according to at least one of: the first subset of a set of resources, a search space, and a spreading code or any combination thereof.

72. A network according to claim 66, wherein the first subset of the set of resources comprises a subset of a plurality of resource blocks, and the first subset of the plurality of Resource Blocks comprises one Resource block every M Resource Blocks of the plurality of Resource Blocks, where M is an integer.

73. A network according to claim 66, wherein the first subset and the further subset of the set of resources comprises respective subsets of a plurality of subcarriers, and the orthogonal transmission comprises: the primary station transmitting the first control data in a signal using the first subset of the plurality of subcarriers, and transmitting the second control data in a further signal using a further subset of the plurality of subcarriers; and the first subset and further subset are different subsets of the plurality of subcarriers, such that, the primary station transmits the data signal in the signal using the first subset of carriers synchronously with the transmission of the second control data in a further signal using the further subset of subcarriers.

74. A network according to claim 66, wherein an indication of the first subset of the set of resources is signaled by the primary station to the secondary station.

75. A network according to claim 66, wherein an indication of the second subset of the set of resources is signaled by the primary station to the secondary station.

76. A network comprising:

a primary station configured to communicate with a first secondary station and to communicate with a second secondary station, the primary station including a processor configured to send via a transmitter first control data to the first secondary station in a first subset of a set of resources, and a further primary station configured to communicate with the first secondary station and to communicate with the second secondary station, the further primary station including a processor configured to send via a transmitter second control data to the second secondary station in a second subset of a set of resources, and wherein the first subset of resources is sent from the primary station to the first secondary station orthogonal to sending the second subset of resources from the further primary station to the second secondary station.

77. A network according to claim 76, wherein the first and second secondary stations are a single secondary station.

78. A network according to claim 76, wherein the first and second subset of resources are orthogonal in the frequency domain.

79. A network according to claim 76, wherein the first and second subset of resources are orthogonal in the time domain.

80. A network according to claim 76, wherein the orthogonality is achieved by puncturing at least one of the first and second control data.

81. A network according to claim 76, wherein the first and second control data is sent from the primary station according to at least one of a subset of a set of resources, a search space, and a spreading code; or any combination thereof.

82. A network according to claim 76, wherein the subset of the set of resources comprises a subset of a plurality of resource blocks, and the subset of the plurality of Resource Blocks comprises one Resource block every M Resource Blocks of the plurality of Resource Blocks, where M is an integer.

83. A network according to claim 76, wherein the subset and the further subset of the set of resources comprises respective subsets of a plurality of subcarriers, and the orthogonal transmission comprises: the primary station transmitting the control data in a signal using the subset of the plurality of subcarriers, and transmitting the further control data in a further signal using a further subset of the plurality of subcarriers.

84. A network according to claim 76, wherein an indication of the first subset of the set of resources is signaled by the primary station to the secondary station.

85. A network according to claim 76, wherein an indication of the second subset of the set of resources is signaled by the primary station to the secondary station.

* * * * *